United States Patent
Nims et al.

(10) Patent No.: US 6,894,809 B2
(45) Date of Patent: May 17, 2005

(54) MULTIPLE ANGLE DISPLAY PRODUCED FROM REMOTE OPTICAL SENSING DEVICES

(75) Inventors: Jerry C. Nims, Atlanta, GA (US); Paul Peters, Suwanee, GA (US); William Karszes, Rosewell, GA (US)

(73) Assignee: Orasee Corp.

( * ) Notice: Subject to any disclaimer, the term of this patent is extended or adjusted under 35 U.S.C. 154(b) by 0 days.

(21) Appl. No.: 10/102,887

(22) Filed: Mar. 22, 2002

(65) Prior Publication Data

US 2003/0164962 A1 Sep. 4, 2003

Related U.S. Application Data

(60) Provisional application No. 60/361,099, filed on Mar. 1, 2002.

(51) Int. Cl.$^7$ ............................................. G02B 27/22
(52) U.S. Cl. ........................ 358/1.9; 359/462; 359/463; 348/143
(58) Field of Search ................................. 359/462, 463; 348/51, 54, 47, 48, 143, 59; 358/1.9

(56) References Cited

U.S. PATENT DOCUMENTS 5,600,402 A * 2/1997 Kainen ........................ 355/22
5,905,593 A * 5/1999 Lo et al. ..................... 359/463
6,133,945 A * 10/2000 Stuettler ..................... 348/51

\* cited by examiner

Primary Examiner—Thomas D. Lee
(74) Attorney, Agent, or Firm—Patton Boggs LLP (57) ABSTRACT

Multiple left-eye, right-eye three images of a ground area are obtained from an aerial or satellite platform. The left-eye, right-eye images are transferred to a digital processor which rasterizes and interleaves the images to an output file for printing. The output file is printed on a hard copy medium and overlaid with a microlens sheet having a plurality of lenses. The lenses refract the printed image such that a viewer sees from a first position relative to the hard copy a three-dimensional image of the ground area as seen from a first aerial or satellite viewing position and, from a second position relative to the hard copy, sees a three-dimensional image of the ground area as seen from a second aerial or satellite viewing position. Optionally, the interleaving and the microlenses are such that a viewer can obtain a 360 degree view, of three dimensional images of the ground area by rotating the hard copy through a plurality of viewing positions.

3 Claims, 4 Drawing Sheets

MULTIPLE ANGLE DISPLAY PRODUCED FROM REMOTE OPTICAL SENSING DEVICES

Priority of this application is based on U.S. Provisional Application No. 60/361,099 filed Mar. 1, 2002.

BACKGROUND OF THE INVENTION

1. Field of the Invention

This invention relates generally to the collection and presentation of optical information and, more particularly, to the acquisition, processing, and hard copy presentation of optical information obtained from a plurality of viewing or sensing angles.

2. Statement of the Problem

The collection and study of optical information is integral to a variety of activities. These activities include, without limitation, airborne and satellite surveillance and monitoring of areas of interest. The collected information is typically digitized on the platform on which the cameras or other optical sensors are mounted, pre-processed and sent by downlink for further processing. The information is often formatted and printed for visual inspection as well. For example, aerial photographs may be studied by skilled persons, both to identify items missed by computer recognition methods and to obtain further information not conveniently or accurately obtained by computer methods.

The 2-dimensional picture has shortcomings. One is that it is 2-dimensional, which has aesthetic and related functional drawbacks. More particularly, the viewer does not obtain a sense of depth from a 2-dimensional picture, and this failure may cause a misinterpretation of information that a 3-dimensional view would have provided.

Another shortcoming with existing art airborne and satellite surveillance systems, and the hard copy images they produce, is that the images show the photographed ground area only as seen from one position and viewing angle that it was originally obtained. For example, a photograph of a ten-foot diameter hole obtained by overflying it with a camera looking down at an angle of 45 degrees with respect to a flight path may fail to present an image of the contents of the hole.

One possible solution to the above example problem is to fly over the item of interest, i.e., the hole, twice, with the camera looking straight down on the second flyover. Other possible solutions include mounting a plurality of cameras on the airborne or satellite platform, or mounting a camera on a steerable gimbal, and thereby obtain a plurality of pictures of a particular ground area, each from a different viewing angle.

There are problems with the above-identified potential solutions. One is that even if a plurality of pictures is obtained, each of the pictures is two-dimensional. The previously identified problems with two-dimensional images remain. Another problem is that assigning a plurality of pictures to cover the various viewing angles of each ground area of interest requires the user to keep track of, and have the burden of viewing, a plurality of hard copy pictures. This creates further problems. One is the overhead caused by the user having to keep track of multiple pictures. Another is that the pictures may not be aligned or registered with respect to one another. For example, the viewer may have a hard copy of a first picture of a ground area, taken from a first airborne surveillance viewing angle, in which a building of interest is situated in, for example, the upper left corner of the copy. A second picture of the same ground area, taken from a second viewing angle, may show the building in its upper right corner. Still another problem, which relates to the previously identified problem, is that the viewer must change his or her visual focus continually, namely by looking at the pictures taken from one viewing angle and then looking at the pictures taken from another viewing angle. This can be inconvenient. It also increases the probability of human error, as the user must remember how something looked from one viewing angle as he or she shifts attention to another hard copy showing how the item appeared from another viewing angle.

The existing art does provide a type of stereoscopic visual surveillance method, in which two frames of information are captured via satellite and transmitted to, for example, the National Reconnaissance Office (NRO). Printable images of the left and right frames are then generated, one being polarized orthogonal to the other, arranged above one another and printed. The user wears polarizing glasses, whereby his or her left eye sees the left image and his or her right eye sees the right image. The user thus sees an apparent three-dimensional image.

Figure 1:
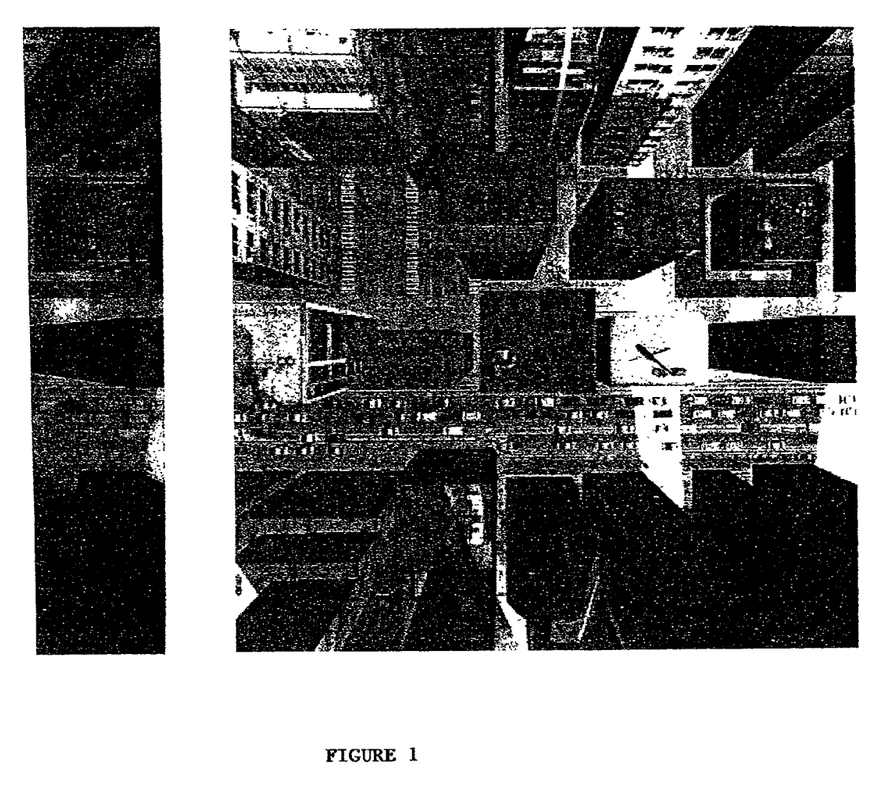
FIG. 1 is an example picture of a building generated for viewing through a polarization-based three-dimensional viewing system.
Figure 4:
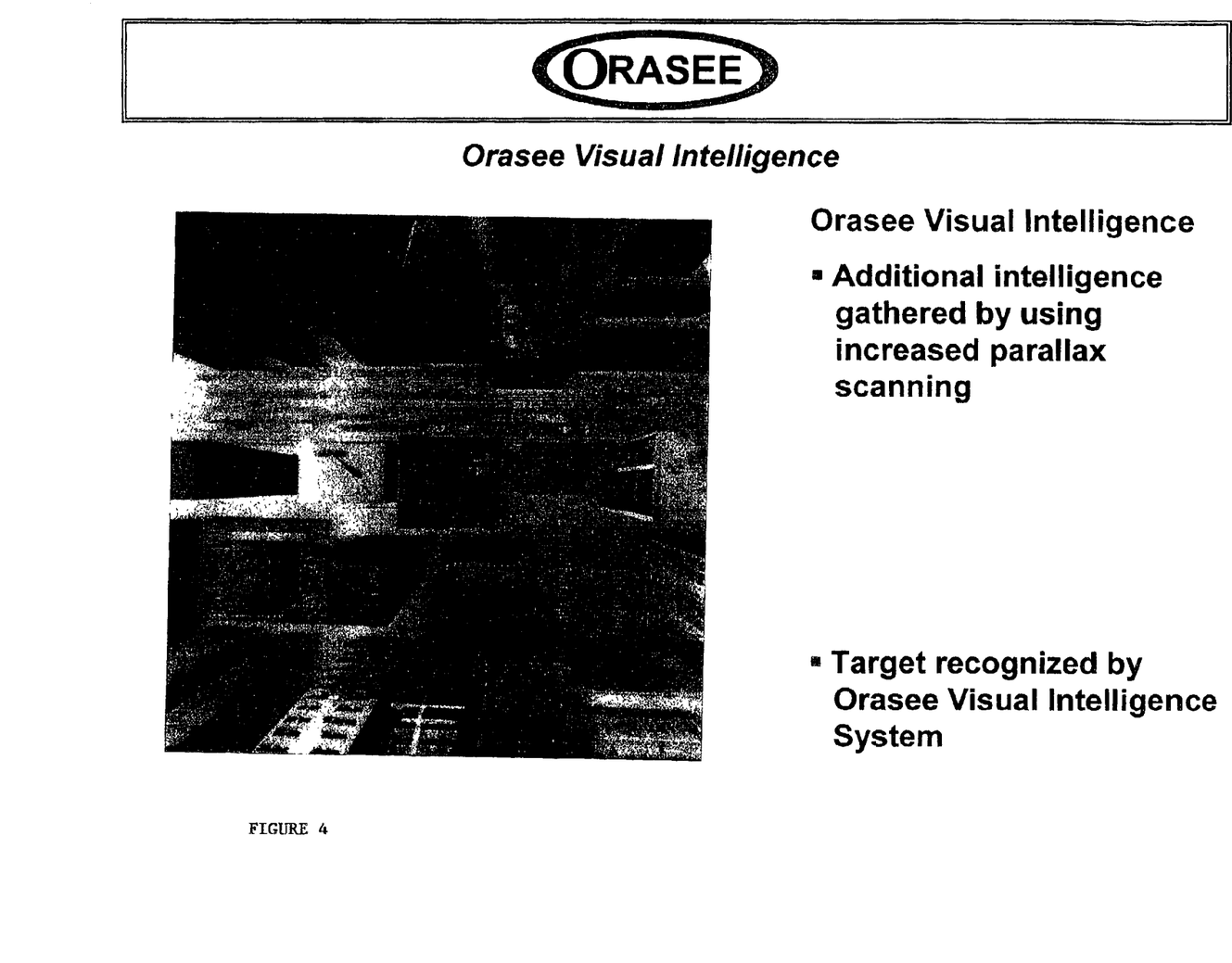
FIG. 4 is a microlens hard copy showing two three-dimensional views of the building shown in FIG. 1, generated in accordance with the methods of the present invention.

However, there are numerous problems with this method. One is that each polarized image pair shows, and is limited to, the ground area of interest as seen from an oblique viewing angle. More particularly, a typical stereoscopic image is formed by mounting two cameras on a satellite. One camera is ahead of the satellite, at a depression angle toward the earth. The other camera looks behind the satellite, at the same depression angle. Therefore, the left image and the right image are each obtained by looking at the ground area of interest at an oblique viewing angle. For this reason the prior art stereoscopic image does not have a direct look-down angle. This can have significant results. Prior art FIG. 1 shows a simulated example of an image of a building 2 as if viewed in its original polarized format through polarized glasses. For purposes of comparison, FIG. 4 is a microlens hard copy of the same building, displaying two three-dimensional views generated and fixed in hard copy in accordance with a method of the present invention. FIG. 1 does not reveal any object proximal to the building 2. One of the two viewing angles provided by FIG. 4, though, reveals a missile 4. The missile 4 cannot be seen in FIG. 1 because it is close against a side wall of the building 2, and the FIG. 1 stereoscopic image was obtained from oblique viewing angles.

Another shortcoming with the prior art stereoscopic views is that, even with the polarizing glasses, only one three-dimensional view of the ground area of interest can be seen from a single hard copy. Therefore, the previously discussed problems of a single viewing angle image are increased. They are increased because not only is the user required to look at multiple hard copies to see what an area or building looks like from different viewing angles, but the pictures are difficult to identify without wearing the glasses. The glasses cause further problems, namely eye fatigue and equipment overhead.

THE SOLUTION

The present invention advances the art and overcomes the problems identified above by placing on a single microlens sheet images of an object or ground area as seen from a remote distance at multiple viewing angles, such that the viewer can move the sheet to see the object from any of the viewing angles. In one embodiment of the invention the original images are taken from the remote distance, and then processed, formatted and fixed to the microlens sheet such that the user will see a plurality of three-dimensional images. The microlens sheet may comprise a plurality of semi-cylindrical or similar cross-section transparent lenses, lying in a plane and extending parallel to one another.

The original images are obtained by, for example, one or more optical detectors mounted on an aerial or space-borne platform. The optical detectors may detect visible or non-visible frequency bands, or combinations of the same. The optical detectors may be steerable or pointable, either by commands entered local to the platform or by uplink. The optical detectors may include a telephoto lens, with or without a zoom feature.

The optical detectors obtain images through one or more fields of view, each field of view having a line-of-sight, or bore sight. Selection of the field of view is, for example, by mounting at least one optical detector on a steerable gimbal.

A first embodiment of the invention is a method including flying the platform, or orbiting it, along a platform path over a ground area of interest. A first detection image is detected by the optical detector from a first position on the platform path such that the ground area of interest is in the first image's field of view. A second detection image is detected by the optical detector when the platform is at a second position on the platform path. Likewise, when the platform is at a third position on the platform path a third detection image is detected. The second detection image and the third detection image are detected such that the ground area of interest is the field of each.

A first digital pixel array representing the first detection image is input to a data processor. Similarly, a second digital pixel array representing the second detection image, and a third digital pixel array representing the third detected image are input to the data processor. The data processor generates an output interphased or interlaced digital pixel array based on the first digital pixel array, the second digital pixel array, and the third pixel array. A visible interphased image is printed on a printable surface of a hard copy sheet, the printed image being based on the output interphased digital pixel array, and a microlens sheet is overlaid onto the printable surface.

The output interphased digital pixel array is generated, and the visible interphased image is printed such that when the microlens sheet is overlaid the user sees, from a first viewing position, a first three-dimensional image based on the first and second detected images and, from a second viewing position, sees a second three-dimensional image based on the second and third detected images.

According to this embodiment, the first three-dimensional image shows a surveillance line of sight extending from the ground area of interest to a point on the platform path halfway between the first viewing position and the second viewing position. Likewise, the second three-dimensional image shows a surveillance line of sight extending from the ground area of interest to a point on the platform path halfway between the second viewing position and the third viewing position. Since the first three-dimensional image and the second three-dimensional image each include a direct down view, each provides a view into holes, between buildings and the like.

In one aspect of the first embodiment, the microlens sheet comprises a plurality of semi-cylindrical or similar cross-section transparent lenses, lying in a plane and extending parallel to one another. A rotation axis lies in the plane and extends in a direction parallel to the lenses. The first orientation and position includes a first rotation of the hard copy sheet about the rotation axis and the second orientation and position includes a second rotation of the hard copy sheet about the rotation axis.

In a further aspect of the first embodiment the microlens sheet comprises a plurality of lenses, each having a circular or elliptical circumference, and each having a hemispherical or aspherical cross-section. A first rotation axis lies in the plane, and a second rotation axis lies in the plane and extends normal to the first rotation axis. The first orientation and position includes a first rotation of the hard copy sheet about the first rotation axis and the second orientation and position includes a second rotation of the hard copy sheet about the first rotation axis.

In a still further aspect of the first embodiment, the microlens sheet comprises a plurality of lenses, each having a circular or elliptical circumference, and each having a hemispherical or aspherical cross-section, according to the previously identified aspect. A fourth detection image is detected from a fourth viewing position spaced laterally in a first direction from the first platform path, with the ground area of interest being in the third detection image field. A fourth digital pixel array representing the fourth detection image is input to the data processor. The data processor generates an output interphased or interlaced digital pixel array based on the first digital pixel array, the second digital pixel array, the third pixel array, and the fourth pixel array. The output interphased digital pixel array is further generated, the visible interphased image is printed, and the microlens sheet is overlaid such that when the user rotates the microlens sheet between a first rotation position and a second rotation position about the second rotation axis, the user sees a visual three-dimensional image based, at least in part, on the fourth detected image.

A further embodiment of the invention is a method including flying the platform along a platform path above a ground area of interest. A first left detection image is detected by the optical detector from a first position on the platform path. A first right detection image is detected by the optical detector from a second position on the platform path. A second left detection image is detected by the optical detector from a third position on the platform path. A second right detection image is detected by the optical detector from a fourth position on the platform path.

In this further embodiment, a first digital pixel array representing the first detection image is input to a data processor. Similarly, a second digital pixel array representing the second detection image, and a third digital pixel array representing the third detected image are input to the data processor. The data processor generates an output interphased or interlaced digital pixel array based on the first digital pixel array, the second digital pixel array, and the third pixel array. A visible interphased image is printed on a printable surface of a hard copy sheet, the printed image being based on the output interphased digital pixel array, and a microlens sheet is overlaid onto the printable surface. The output interphased digital pixel array is generated, and the visible interphased image is printed such that when the microlens sheet is overlaid the user sees, from a first viewing position, a first three-dimensional image based on the first and second detected images and, from a second viewing position, sees a second three-dimensional image based on the second and third detected images.

In a variation of this embodiment, the platform path is any of a curved path, semicircular or circular path, or combination of such paths, about a surveillance axis extending normal to the ground area of interest. In this variation the microlens sheet comprises a plurality of lenses, each having a circular or elliptical circumference, and each having a hemispherical or aspherical cross-section, according to the previously identified aspect. In this variation a fourth detection image is detected and when the platform is at a fourth position on the platform path. The fourth detection image is such that the ground area of interest is in its field.

In this variation, a fourth digital pixel array representing the fourth detection image is input to the data processor. The data processor generates an output interphased or interlaced digital pixel array based on the first digital pixel array, the second digital pixel array, the third pixel array, and the fourth pixel array. The output interphased digital pixel array is further generated, the visible interphased image is printed, and the microlens sheet is overlaid such that when the user rotates the microlens sheet between a first rotation position and a second rotation position about the second rotation axis, the user sees a visual three-dimensional image based, at least in part, on the fourth detected image.

An objective of the present invention is to convert remotely acquired images into one or more hard copy motion, or hard copy multidimensional images and/or display devices, to dramatically improve visual intelligence. The hard copy information can then be used, for example, in briefings and distributed to those involved, e.g., pilots, special ops, before carrying out a mission. The micro lens sheet has been specifically designed to map special algorithms that maintain the geometric and physical properties of light waves. This is accomplished by interphasing the light waves in the precise formulas that are designed to fit the specific requirements of the particular discipline being used. The micro lenses are also designed to transmit back to the human visual system the light waves that closely replicate the original scene or object. The micro lens sheet thereby serves as a method of storage and translation of reconnaissance information. The micro lens sheet permits the viewer to see a multidimensional projection or a "360 degree look-around" view including, for example, height of objects including, for example, buildings, mountains, fires, etc. without the aid of further processing and display equipment.

These and other objects, features and advantages of the present invention will become more apparent to, and better understood by, those skilled in the relevant art from the following more detailed description of the preferred embodiments of the invention taken with reference to the accompanying drawings, in which like features are identified by like reference numerals.

DETAILED DESCRIPTION OF THE INVENTION

Figure 2:
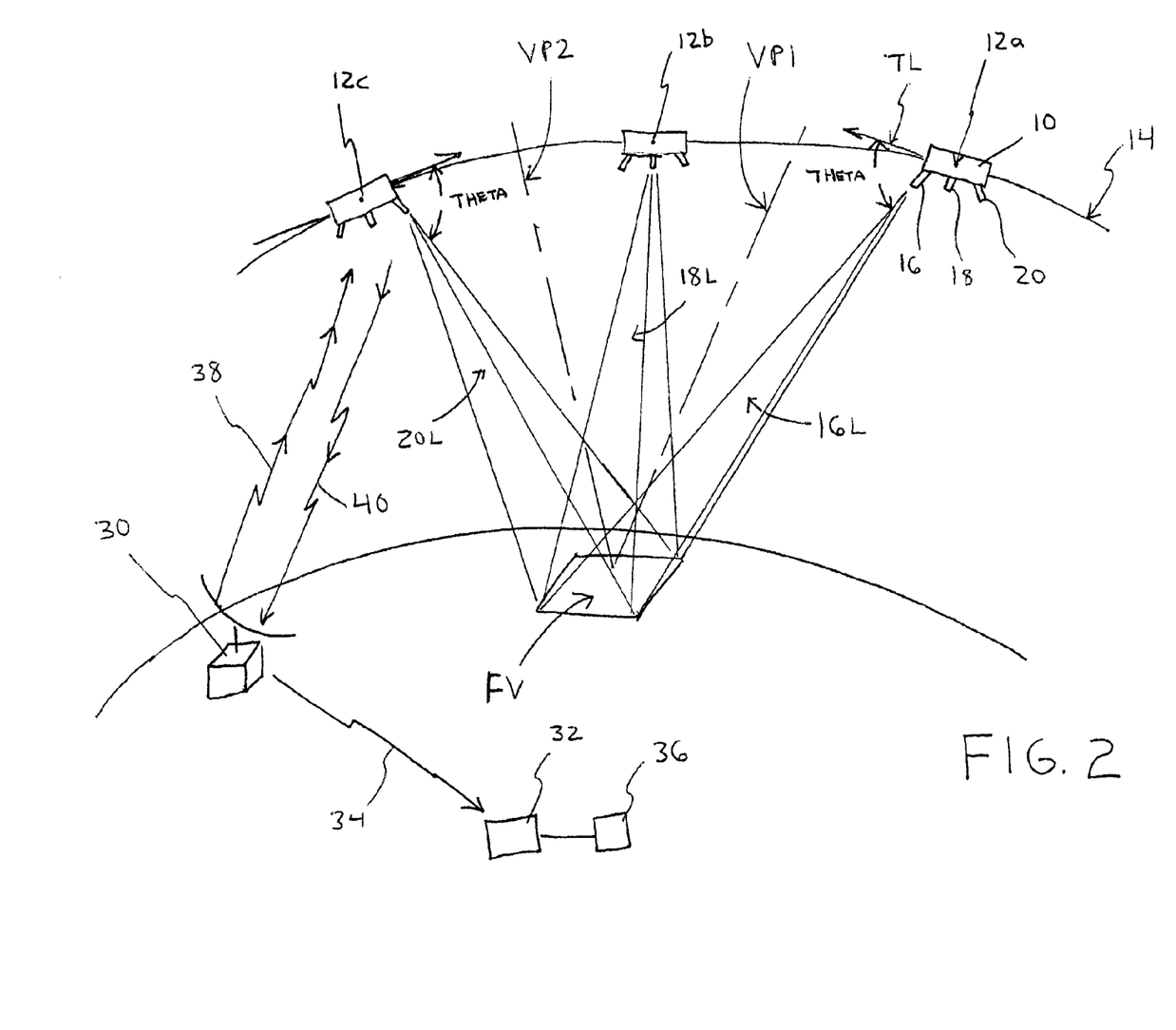
FIG. 2 depicts an example surveillance system according to the present invention.

FIG. 2 shows an example of a surveillance system for carrying out the method of the present invention. The FIG. 2 system comprises a low earth orbit (LEO) satellite 10, shown at position 12a, position 12b, position 12c and position 12c along an orbit path 14. Mounted on the satellite 10 is a forward-looking camera 16, a nadir camera 18, and rearward-looking camera 20. For purposes of example it will be assumed that the cameras 16, 18 and 20 detect images in the visual near-infrared (VNIR) band. This is not a limitation, as the invention can utilize any optical band. The forward camera 16 has a line of sight 16L pointing down from the orbit tangent line TL at an angle THETA. The line of sight 18L of the nadir camera 18 points directly down, and the rearward camera 20 has a line of sight 20L that points down at angle of minus THETA. The forward camera 16 is shown at position 12a as covering a field of view FV on the ground. As shown, when the satellite 10 is at position 12b the nadir camera 18 has a field of view covering the same area FV. Similarly, when the satellite is at position 12c the field of view of the rearward camera 20 is the area FV.

The above-described example platform is known in the art and therefore a further detailed description is not necessary. Other known platforms and arrangements of cameras are known in the art and may be used. For example, the cameras 16, 18 and 20 could be for bandwidths other than VNIR, examples being panchromatic and shortwave infrared (SWIR). Additional cameras may be mounted on the platform as well.

The alignment procedures for the cameras is known in the art and, therefore, description is omitted. The uplink and downlink systems for communications from the ground station 30, and the procedures and systems for controlling and stabilizing the satellite 10 are known in the art, and description for these is also omitted.

Also shown in FIG. 1 is a ground station 30, a processing station 32, a communication link 34 between the ground station 30 and the processing station 32, and an inkjet printer 36. An uplink 38 carries command and control signals from the ground station 30 to the satellite 10, and a downlink 40 carries camera sensor data, described below, and satellite status information. The ground station 30, the uplink 38 and the downlink 40 are in accordance with the known art of satellite communication and control and, therefore, description is not necessary for understanding or practicing this invention.

Figure 3:
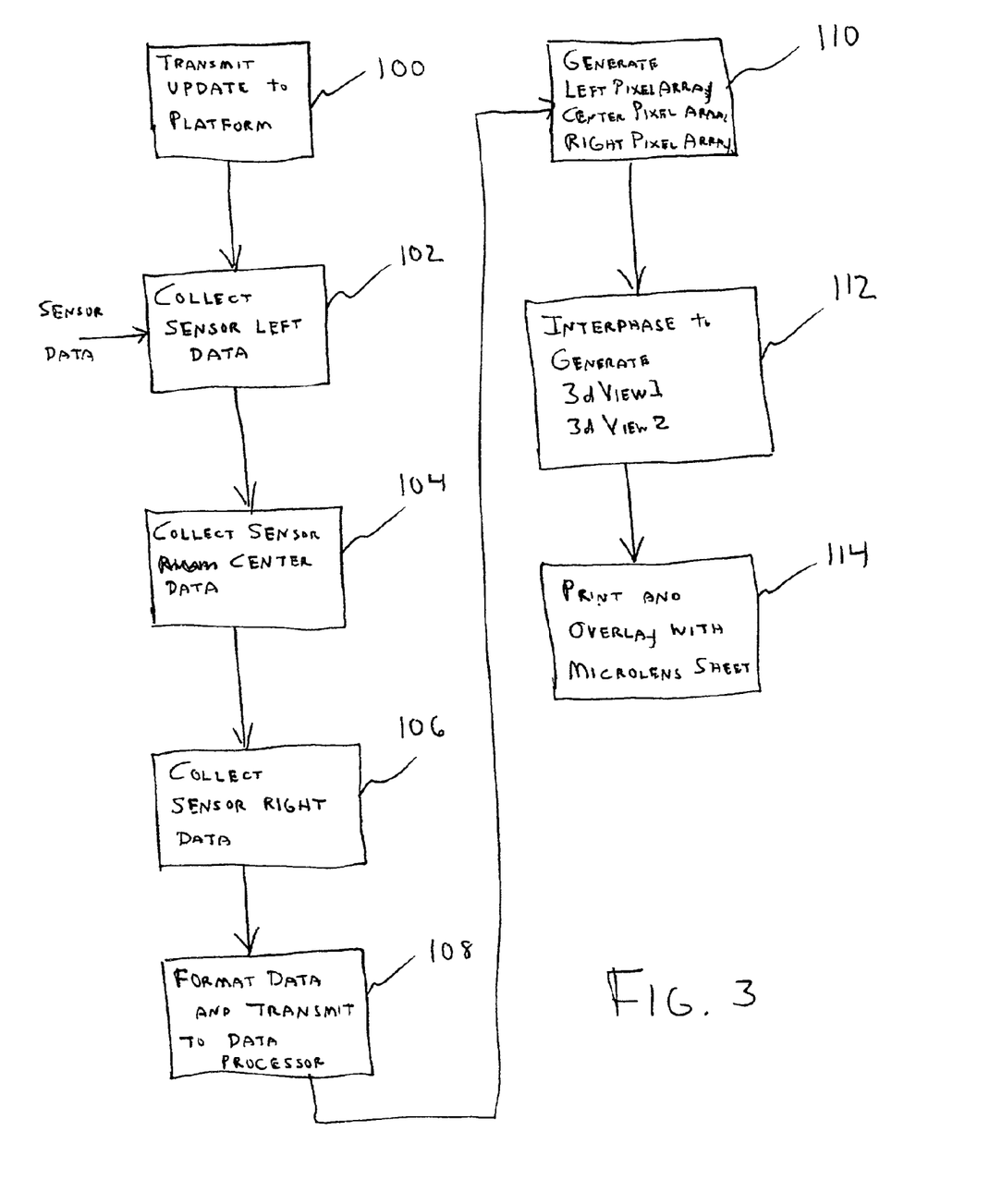
FIG. 3 shows an example flow chart of a first method according to the present invention.

FIG. 3 shows an example flow chart for a first embodiment of the invention, and an example operation will be described in reference to the system illustrated by FIG. 2. The example describes only generating and displaying, according to this invention, a multi-view image of one ground area, labeled FV. In actual operation a multi-view image would likely be generated of a plurality of ground areas LV and, as will be understood by one of ordinary skill in the field of satellite and airborne surveillance, such images can be obtained by repeating the FIG. 3 method.

Referring to FIG. 3, UPDATE commands are first sent by uplink at block 100. As known in the art, block 100 is for illustrative purposes only, and need not be repeated each time that image sensing data is to be collected. As also understood, the timing, specific content, protocols, and signal characteristics of the UPDATE commands are specific to the particular kind and configuration of the satellite 10 and the ground station 30, and such commands are readily implemented by persons skilled in the art of satellite controls.

Next, at block 102 SENSOR LEFT data is collected by the ground station 30 from camera 16 when the satellite is position 12a. Then, at block 104, when the orbiting satellite 10 is at position 12b SENSOR CENTER data is collected from camera 18. Next, at block 106, when the orbiting satellite 10 is at position 12c SENSOR RIGHT data is collected from camera 20. It will be understood that blocks 102, 104 and 106 are not necessarily performed as separate data collection steps. Instead, depending on the downlink protocol, the SENSOR LEFT, SENSOR CENTER and SENSOR RIGHT data, i.e., data from cameras 16, 18 and 20, may be multiplexed onto a single data stream and continually collected during a time interval that includes the times that the satellite is at positions 12a, 12b and 12c. Further, the collection is not necessarily performed at the ground station 30, because other ground receiving stations (not shown) may receive the data downlink from the satellite 10. Such arrangements of ground stations and data collection stations are known in the art. Still further, the collection steps 102, 104 and 106 may include retransmission through ground repeaters (not shown), as well as encryption and decryption, and land-line transmissions. These data transfer methods and protocols are known in the art.

After the SENSOR LEFT, SENSOR CENTER, and SENSOR RIGHT data is collected the method goes to step 108, which formats the data, sends it over the link 34 and inputs it to a data processor, shown as item 32 in FIG. 2. The link 34 may be the Internet and, accordingly, the formatting, transfer and input may further include data and data network transmissions such as, for example, a File Transfer Protocol (FTP) transfer. Further, the link 34 is shown for purposes of example only. The data processor 32 may be local to the ground station 30, or to any other ground receiving station.

The data processor 32 can be any of a large variety of standard commercially available general purpose programmable digital computers (not shown) having, for example, a standard protocol digital input port, a microprocessor, operating system storage, operating system software stored in same, application program storage, data storage, a standard protocol digital output port and, preferably, a user interface, and a video screen. An example computer is a Dell® model Optiplex® GX 150 having a 1 GHz Intel® Pentium® III or Celeron® microprocessor, 528 MByte RAM, a 60 GByte hard drive, a 19 inch conventional cathode ray tube (CRT) video display, and a standard keyboard and mouse for user entry of data and commands, running under Microsoft Windows 2000® or Windows XP® operating system.

After inputting to the data processor 32, step 110 reformats the SENSOR LEFT, SENSOR CENTER and SENSOR RIGHT data into a three M X N pixel arrays, which are labeled for reference purposes as LeftPixelArray, CenterPixelArray and RightPixelArray. The step 110 reformatting is based on a predetermined, user-input MicroLensData which characterizes physical parameters of the microlens sheet on which the final image set will be printed. Step 110 may also be based on a PrinterResData characterizing performance parameters of the printer 36, particularly the printer's resolution in, for example, dots per inch (DPI). For example, if the microlens sheet is a lenticular sheet (not shown) having a plurality of semi-cylindrical or equivalent lenses the MicroLensData will characterize the spacing of the lenses in lenses per inch (LPI), as well as the length and width of the final hard copy picture. Step 110 uses this LPI data, and the PrinterResData, to convert the SENSOR LEFT, SENSOR RIGHT and SENSOR CENTER data into N×M pixel arrays LeftPixelArray, CenterPixelArray and RightPixelArray, with N and M selected to place an optimal number of printed pixels under each lenticule.

As known to persons skilled in the image collection arts, the pixel resolution of the nadir camera 18 may differ from the pixel resolution of the forward and rearward looking cameras 16 and 20. The pixel resolution may differ in terms of the number of pixels generated by the camera, and by the ground area represented by each pixel. One reason for the latter is that the image field of the forward and rearward cameras 16 and 20, in terms of the total ground area, is typically larger than that covered by the nadir camera 18. For example, each pixel generated by the nadir camera 18 may represent 5 meters by 5 meters of ground area, while each pixel generated by the cameras 16 and 20 may represent, for example, 8 meters by 8 meters. These pixel values are only for purposes of example, and assume that no filtering, or resolution altering processing has been performed. To equalize the ground area represented by each pixel of the nadir camera and the ground area represented by each pixel of the forward and rearward cameras 16 and 20, image mapping algorithms may be used. Such algorithms are well-known in the art.

The images represented by LeftPixelArray, CenterPixelArray and RightPixelArray are of the same ground area LV, viewed from the three positions shown in FIG. 2 as 12a, 12b, and 12c. The difference between the LeftPixelArray and CenterPixelArray is a parallax equivalent to a viewer having his or left eye at position 12a and his or her right eye at position 12b and looking at the LV area. Therefore, if the LeftPixelArray image is presented to the viewer's left eye, and the CenterPixelArray is presented to the viewer's right eye, he or she will see a three-dimensional image of the LV area, as if viewed from a center line halfway between 12a and 12b, which is labeled as VP1 on FIG. 2. Likewise, if the CenterPixelArray is presented to the viewer's left eye, and the RightPixelArray is presented to the viewer's right eye then he or she will see a three-dimensional image of the LV area, as if viewed from a center line halfway between 12b and 12c points, which is labeled VP2 on FIG. 2.

To accomplish this, step 112 generates a 3dView1 and a 3dView2 image, the first being a 2N×2M pixel array representing a rasterization and interlacing of the LeftPixelArray and CenterPixelArray, and the second being a pixel array of the same format representing a rasterization and interlacing of the CenterPixelArray and RightPixelArray. The 3dView1 pixels are spaced such that when overlaid by the microlens sheet the light from pixels corresponding to the LefPixelImage are diffracted in one direction and the light from pixels corresponding to the CenterPixelArray are diffracted in another direction. Similarly, the 3dView2 pixels are spaced such that when overlaid by the microlens sheet the light from pixels corresponding to the CenterPixelImage are diffracted in one direction and the light from pixels corresponding to the RightPixelArray are diffracted in another direction. The optical physics of the diffraction are known in the lenticular arts. An example description is found in U.S. Pat. No. 6,091,482.

Utilizing mathematical and ray-trace models of the microlens sheet, Step 112 generates 3dView1 to have a pixel spacing, relative to the lenses of the microlens sheet, such that when a user views the microlens sheet from a first viewing direction light from the LeftPixelArray pixels impinges on the viewer's left eye, and light from the CenterPixelArray pixels impinges on the viewer's right eye. Therefore, when the viewer looks at the microlens sheet from the first viewing direction the viewer sees a three-dimensional image of the LV area, as if seen from the VP1 position. Likewise, step 112 generates 3dView2 such that the pixels are spaced relative to the lenses of the microlens sheet so that when a user views the microlens sheet from a second viewing direction light from the CenterPixelArray pixels impinges on the viewer's left eye, and light from the RightPixelArray pixels impinges on the viewer's right eye. Therefore, when the viewer looks at the microlens sheet from the second viewing direction the viewer sees a three-dimensional image of the LV area, as if seen from the VP2 position.

Regarding the mathematical and/or ray-trace models of the microlens sheet, the generation and utilization of such models, including models of lenticular and other multiple lens sheets, is well known in the imaging arts and, therefore, a description of these need not be presented here.

At step 114, the pixels for 3dView1, 3dView2, 3dView3 and 3dView4 are printed and overlaid with a microlens sheet comprising a plurality of circular footprint lenses, each having a hemispherical or aspherical cross section. For purposes of reference, the microlens sheet has a first rotation axis extending in a direction in the plane of the microlenses and a second rotation axis extending in the same plane but perpendicular to the first rotation axis. The spacing of the 3dView1, 3dView2, 3dView3 and 3dView4 pixels, with respect to the microlens sheet lenses, are such that when the viewer's line sight is at a first rotation about the first axis the viewer sees a three-dimensional image corresponding to 3dView1. When the viewer's line of sight is at a second rotational position about the first axis, he or she sees an image corresponding to the 3dView2 image. When the user rotates the microlens sheet to a particular position about the second axis, the viewer sees a three-dimensional image corresponding to the 3dView3 image. Likewise, when the user rotates the microlens sheet to another particular position about the second axis, the viewer sees a three-dimensional image corresponding to the 3dView4 image.

As an alternative to printing the 3dView1, 3dView2, 3dView3 and 3dView4 pixels on a printable material and then overlaying that material with a microlens sheet, the pixels can be printed directly on a microlens sheet having a printable back surface.

Using the above-described embodiment, the viewer is provided with a single hard copy which, with respect to a building, shows the building's left face, right face, front face and back face, each view being three-dimensional. Further, referring to FIG. 2, provided that images on which the three-dimensional images are based are obtained from a viewing position such as 12b, the viewer will have the option of rotating the hard copy so that he or she looks directly down at the ground area of interest.

The present invention thereby presents the user, by way of a single hard copy, with the two three-dimensional views, one as if seeing the LV area from VP1 and the other as is seeing the LV area from VP2. Unlike the prior art, the user does not have to wear glasses to see any of the 3-dimensional pictures. Instead, with the unaided eye the user can see multiple views of an area or object using only a single hard copy. The prior art, in contrast, provides only a single three-dimensional view which the user must wear special glasses to see. Therefore, with the present invention the user does not have to wear special glasses and does not have to keep track of, and look back and forth between a plurality of pictures when studying an area or item of interest. Further, the hard copies can be any viewable size such as, for example, 8½" by 11", paper size "A4", large poster-size sheets, or 3" by 5" cards.

FIG. 4 is a microlens hard copy of a simulated ground area imaged in accordance with the above-described invention. The simulated ground area includes a building 2. The FIG. 4 microlens hard copy provides two three dimensional views of the ground area. In one of the two three-dimensional views a missile, labeled as item 4, is seen located against a side wall of the building. The FIG. 1 simulation of an existing art stereoscopic image of the building 2 does not show the missile 4. It does not because the viewing angle would have to a nadir angle, as that obtained from the nadir camera 16. Such a nadir image of the building 2 is included in one of the two three-dimensional views of the building 2 provided by FIG. 4. For a user of the prior art to be able to detect the missile 4 the user would have to given a hard copy separate from FIG. 1. Therefore, as can be seen, the user would have to wear polarizing glasses to see what is shown by FIG. 1, and then look at a separate image, of one was provided, to see the missile 4. The present invention solves these problems by providing the user with a hard copy showing multiple three dimensional views of the area of interest, and the user can inspect each of these, in three dimensional viewing, by simply rotating the hard copy.

The example above was described using three image-taking positions, namely 12a, 12b and 12c, and generating two three-dimensional images as a result. A larger number of image-taking positions may be used. Also, the above-described example used images taken from position 12a and 12b to generate the three dimensional image along the line of sight VP1, and the image taken from point 12b again, paired with the image taken from position 12c to generate the three dimensional image along view line VP2. In the alternative, the second three dimensional image could have used additional viewing positions, each spaced in the orbit direction beyond points 12b and 12c. Further, the above-described example obtained images by orbiting a single satellite in a planar orbit forming an arc over the imaged area. A 360 degree viewing angle hard copy may be generated by using two satellites, with their respective orbits crossing over one another above the area of interest, at angle preferably close to ninety degrees. The first satellite would obtain three images representing, respectively, the area of interest as seen from a first, second and third position along that satellite's orbit. From these three images two left-right images would be generated, such as the 3dView1 and 3dView2 images described above. The second satellite obtains three images representing, respectively, the area of interest as seen from a first, second and third position along that satellite's orbit. From these three images two additional left-right images are generated, and these may be labeled as 3dView3 and 3dView4.

FIG. 2 shows the satellite 10 as an example platform. The present invention further contemplates use of an airborne platform. The airborne platform can be manned or unmanned. The cameras can be gimbal mounted, with automatic tracking and stabilization, as known in the art of airborne surveillance. Such a system may fly the platform in a circular path around a ground area of interest and obtain a plurality of detection images from various points along the path. The image data may be downloaded during flight or stored on board the platform for later retrieval. Two or more pairs of the detection images would be used to generate left-eye and right eye-images, each pair having the parallax information for a three-dimensional view from a viewing angle halfway between the position from which the left eye image was detected and the position from which the right eye image was detected. Registration and alignment on the left eye and right eye images may be performed, using known image processing techniques, before interphasing their respective pixel arrays for printing and viewing through a microlens sheet.

The present invention further contemplates use of multiple platforms for obtaining the plurality of detection images of a particular ground area of interest.

Those skilled in the art understand that the preferred embodiments described above may be modified, without departing from the true scope and spirit of the invention, and that the particular embodiments shown in the drawings and described within this specification are for purposes of example and should not be construed to limit the invention as set forth in the claims below.

We claim:

1. A method for high altitude imagery, comprising:
   providing a movable platform supporting an optical detector for detecting a two-dimensional image, said optical detector having an optical axis;
   placing said platform at a high altitude above ground;
   moving said platform in a platform movement direction;
   detecting a first image of a ground area from a first point at said altitude, said first point being such that said ground area is forward, in said platform movement direction, from the intersection of an altitude vector extending downward to the ground in a direction normal to the platform movement direction, and said detection having said optical axis extending forward at an angle THETA with respect to said platform movement direction;
   detecting an intermediate image of the ground area from an intermediate first point at said altitude, said intermediate point being such that said ground area is proximal to the intersection of the altitude vector and ground, and said detecting having said optical axis substantially collinear with said altitude vector;
   detecting a second image of the ground area from a said second point at said altitude, said second point being such that said ground area is behind, in a direction opposite said platform movement direction, from the intersection of the altitude vector and ground, and said detection having said optical axis extending backward in a direction opposite said platform movement direction, at said angle THETA with respect to said platform movement direction;
   generating a first image pixel array corresponding to the first image, an intermediate image pixel array corresponding to the intermediate image and a second image pixel array corresponding to the second image;
   storing a microlens data representing values of physical parameters of a microlens sheet;
   interleaving the first image pixel array, the intermediate pixel array, and the second image pixel array to form an output interleaved pixel array, the output interleaved pixel array based at least in part on the microlens data;
   printing the output interleaved pixel array on a printable medium; and
   viewing the printed output interleaved pixel array through the microlens sheet,
   wherein said interleaving and printing are performed such a first stereo image of said ground area is visible from a first viewing position, said first stereo image based on said first image and said intermediate image, and a second stereo image of said ground area is visible from a second viewing position, said second stereo image based on said intermediate image and said second image.

2. A method according to claim 1, wherein said first stereo image represents said ground area as if seen from an observational position having a line-of-sight between said first point and said intermediate point, and said second stereo image represents said ground area as if seen from an observational position having a line-of-sight between said second point and said intermediate point.

3. A method according to claim 1, wherein
   said optical detector includes a forward-looking camera, a rearward-looking camera, and a nadir camera, the forward-looking camera having its optical axis extending forward at said angle THETA from said direction of platform movement, the rearward-looking camera having its optical axis extending rearward at said angle THETA from a vector opposite said platform movement direction, and said nadir camera having its optical axis extending normal to said direction of platform movement.

* * * * *